United States Patent
Matthes et al.

(10) Patent No.: US 9,612,879 B2
(45) Date of Patent: Apr. 4, 2017

(54) SYSTEM CONSTRAINTS-AWARE SCHEDULER FOR HETEROGENEOUS COMPUTING ARCHITECTURE

(71) Applicant: Texas Instruments, Incorporated, Dallas, TX (US)

(72) Inventors: Katrin Matthes, Biot (FR); Damien Ramonda, Mougins (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 297 days.

(21) Appl. No.: 14/106,022

(22) Filed: Dec. 13, 2013

(65) Prior Publication Data

US 2015/0040136 A1  Feb. 5, 2015

(30) Foreign Application Priority Data

Aug. 1, 2013  (EP) .................................... 13290182

(51) Int. Cl.
*G06F 9/46*  (2006.01)
*G06F 9/50*  (2006.01)

(52) U.S. Cl.
CPC .......... *G06F 9/5094* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 2008/0077928 A1* | 3/2008 | Matsuzaki | G06F 9/5044 718/104 |
| 2009/0288092 A1* | 11/2009 | Yamaoka | G06F 9/5033 718/104 |
| 2013/0132972 A1* | 5/2013 | Sur | G06F 1/206 718/105 |

* cited by examiner

*Primary Examiner* — Wissam Rashid
(74) *Attorney, Agent, or Firm* — Kenneth Liu; Charles A. Brill; Frank D. Cimino

(57) ABSTRACT

Processors, systems, and methods are arranged to schedule tasks on heterogeneous processor cores. For example, a scheduler is arranged to perform a heuristics based function for allocating operating system tasks to the processor cores. The system includes a hint generator providing a system constraints-aware function that biases the scheduler to select a processor core depending on the change in one or more performance constraint parameters.

20 Claims, 5 Drawing Sheets

SYSTEM CONSTRAINTS-AWARE SCHEDULER FOR HETEROGENEOUS COMPUTING ARCHITECTURE

CLAIM OF PRIORITY

This application for Patent claims priority to EP PS Application No. 13290182.8 entitled "SYSTEM CONSTRAINTS-AWARE SCHEDULER FOR HETEROGENEOUS COMPUTING ARCHITECTURE" filed Aug. 1, 2013 in the French Patent Office, wherein the application listed above is incorporated by reference herein.

BACKGROUND

Increased integration of digital processors has led to processor architectures that include multiple cores in order to provide increased functionality and processing capabilities. The increased integration and increased functionality also leads to greater power consumption and/or power dissipation. Excessive power consumption and power dissipation often limit the functionality of devices that incorporate processors having multicore architectures. For example, the time duration of portable devices operating in an active mode is limited by the ability of portable power supplies (which can be expensive, bulky, and heavy) to meet the power consumption and dissipation demands of the portable devices.

SUMMARY

The problems noted above can be solved in large part by a system constraints-aware scheduler for heterogeneous computing architecture. Portable devices run a large variety of applications that include different tasks. Some of these tasks are processing intensive while others have much lighter workloads. A heterogeneous computing architecture is designed to address asymmetric workloads by scheduling processing intensive tasks on bigger cores that have more complex features and higher speeds (while typically consuming more power) and by scheduling tasks with lighter workloads on simpler, smaller and more power efficient cores. The disclosed system constraints-aware scheduler is arranged, for example, to optimize the system performance under system constraints (e.g., temperature, battery level, user settings) that vary over time.

As disclosed herein, a processor may include a plurality of heterogeneous processor cores, a scheduler, and a hint generator. The scheduler may be communicatively coupled with each of the plurality of processor cores, and with a task queue including processing tasks. The scheduler is arranged to allocate the one or more processing tasks from the task queue to a selected processor core, typically based on a heuristic function and a load balancing mechanism. The hint generator is arranged to monitor one or more predetermined performance constraint parameters of the system at any given point in time to compute a system constraints-aware function that changes the way tasks are scheduled on the heterogeneous processor cores. The system constraints-aware function biases the scheduler to allocate processing tasks based on the change in one or more performance constraint parameters, which typically results in fewer tasks being scheduled on higher performing cores when the temperature is increasing or the battery level decreasing. Accordingly, the optimized scheduling results in a substantial difference in system performance.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

BRIEF DESCRIPTION OF THE DRAWINGS

The following figures show example embodiments according to the inventive subject matter, unless noted as showing prior art.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections.

Figure 1:
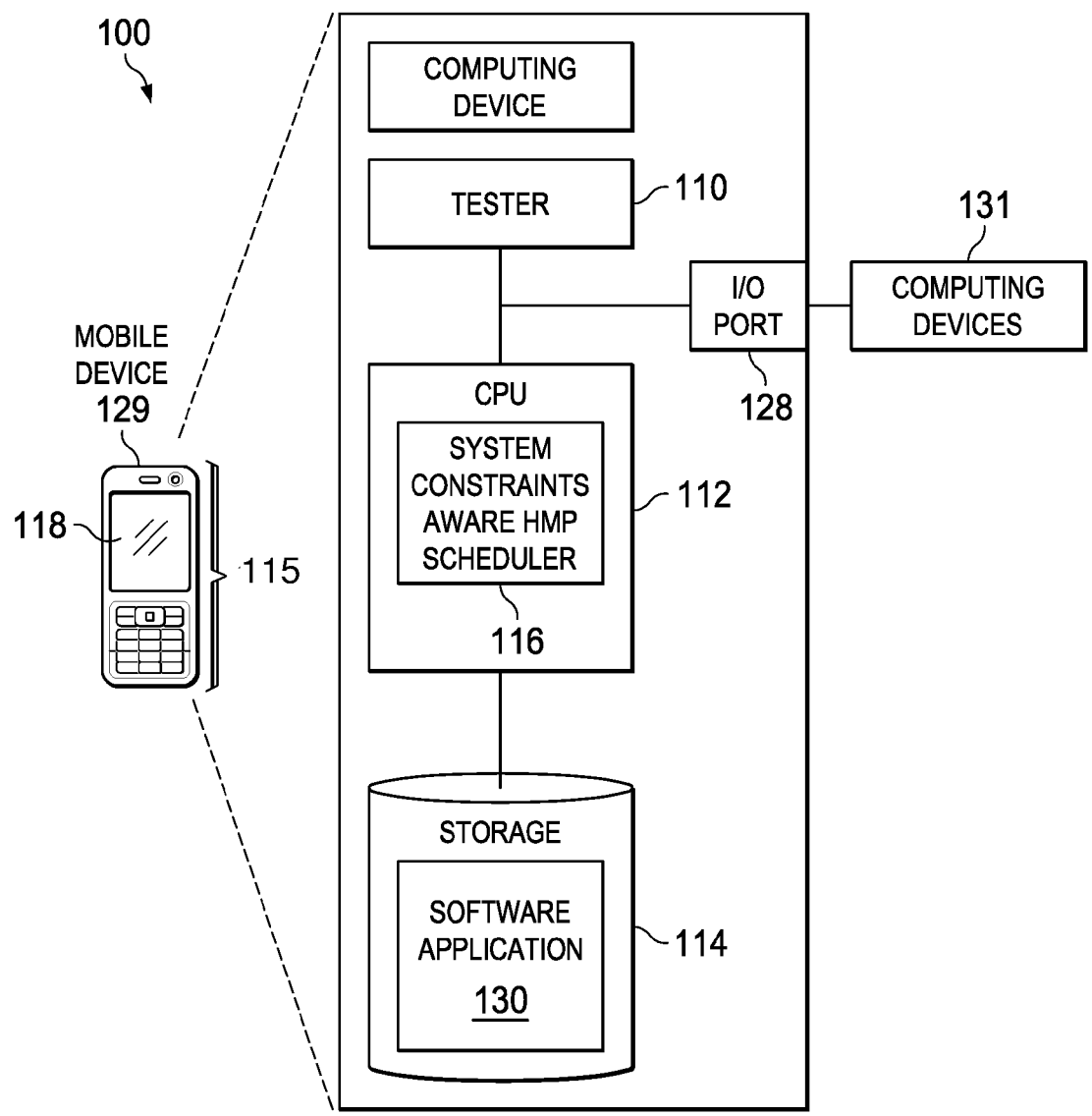
FIG. 1 shows an illustrative electronic device in accordance with example embodiments of the disclosure.

FIG. 1 is a block diagram illustrating a computing device 100 in accordance with example embodiments of the disclosure. For example, the computing device 100 is, or is incorporated into, a mobile communication device 129, such as a mobile phone, a personal digital assistant, a personal computer, automotive electronics, projection (and/or media-playback) unit, or any other type of electronic system.

In some example embodiments, the computing device 100 comprises a megacell or a system-on-chip (SOC) which includes control logic such as a CPU 112 (Central Processing Unit), a storage 114 (e.g., random access memory (RAM)) and a tester 110. The CPU 112 can be, for example, a CISC-type (Complex Instruction Set Computer) CPU, RISC-type CPU (Reduced Instruction Set Computer), or a digital signal processor (DSP). As further discussed below, CPU 112 can be a multicore processor, for example a heterogeneous multicore processor including a combination of one or more cores.

The storage 114 (which can be memory such as RAM, flash memory, or disk storage) stores one or more software applications 130 (e.g., embedded applications) that, when executed by the CPU 112, perform any suitable function associated with the computing device 100. For example, the heterogeneous multicore processing (HMP) scheduler can be implemented using program and/or data information stored in storage 114.

The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). In this way, the software application 130 can be debugged in an environment which resembles post-production operation.

The CPU 112 comprises memory and logic that processes and/or (at least temporarily) stores information under control of programs accessed from the storage 114. The computing device 100 is often controlled by a user using a UI (user interface) 115, which provides output to and receives input from the user during the execution the software application 130. The output is provided using the display 118, indicator lights, a speaker, vibrations, and the like. The input is received using audio and/or video inputs (using, for example, voice or image recognition), and electro-mechanical devices such as keypads, switches, proximity detectors, and the like. CPU 112 may execute operating system tasks and/or application specific tasks that manipulate text, numbers, graphics, audio, video or a combination of these elements (e.g., in audio and/or video steaming applications).

The CPU 112 and tester 110 are coupled to I/O (Input-Output) port 128, which provides an interface that is configured to receive input from (and/or provide output to) peripherals and/or computing devices 131, including tangible (e.g., "non-transitory") media (such as flash memory) and/or cabled or wireless media (such as a Joint Test Action Group (JTAG) interface). These and other input and output devices are selectively coupled to the computing device 100 by external devices using wireless or cabled connections. The CPU 112, storage 114, and tester 110 are also coupled to a programmable power supply, which is configured to receive power from a power source (such as a battery, solar cell, "live" power cord, inductive field, fuel cell, and the like).

Multicore processors (such as SOCs) often include heterogeneous MPU (multicore processing unit) cores for which processing tasks are scheduled for execution. Each core in the heterogeneous environment can have a specific function and can include a specialized instruction set. Generally, a heterogeneous multicore system can be more efficient than a homogenous architecture in targeted applications because, for example, each core can work at different speeds and under different voltage values that are directed towards specific tasks. As disclosed herein, a system constraints-aware scheduler 116 is arranged to schedule tasks in accordance with system operating constraints.

The system constraints-aware scheduler 116 may receive processing (including, for example, operating system and application) tasks from a task queue (such as task queue 304 discussed below with respect to FIG. 3). A task queue is an interface arranged between the scheduler 116 and the storage 114 that provides, for example, a set of processing tasks on a first-in, first-out (FIFO) basis. The scheduler allocates the processing tasks from the task queue for execution upon the most suitable (e.g., efficient for the task) cores of CPU 112.

The heterogeneous cores may include a combination of processors of varying processing power and power requirements. For example a combination can include "big" cores and "little" cores. As used herein, the term "big" core generally refers to more powerful cores and the term "little" core generally refers to more power efficient cores. Thus, a multicore processor can include a combination of N processor cores, with each arranged to perform one or more processing tasks simultaneously and with N being any number greater than one. In various embodiments, each core may include internal functional blocks such as one or more execution units, retirement units, a set of general purpose and specific registers, and the like.

Figure 2:
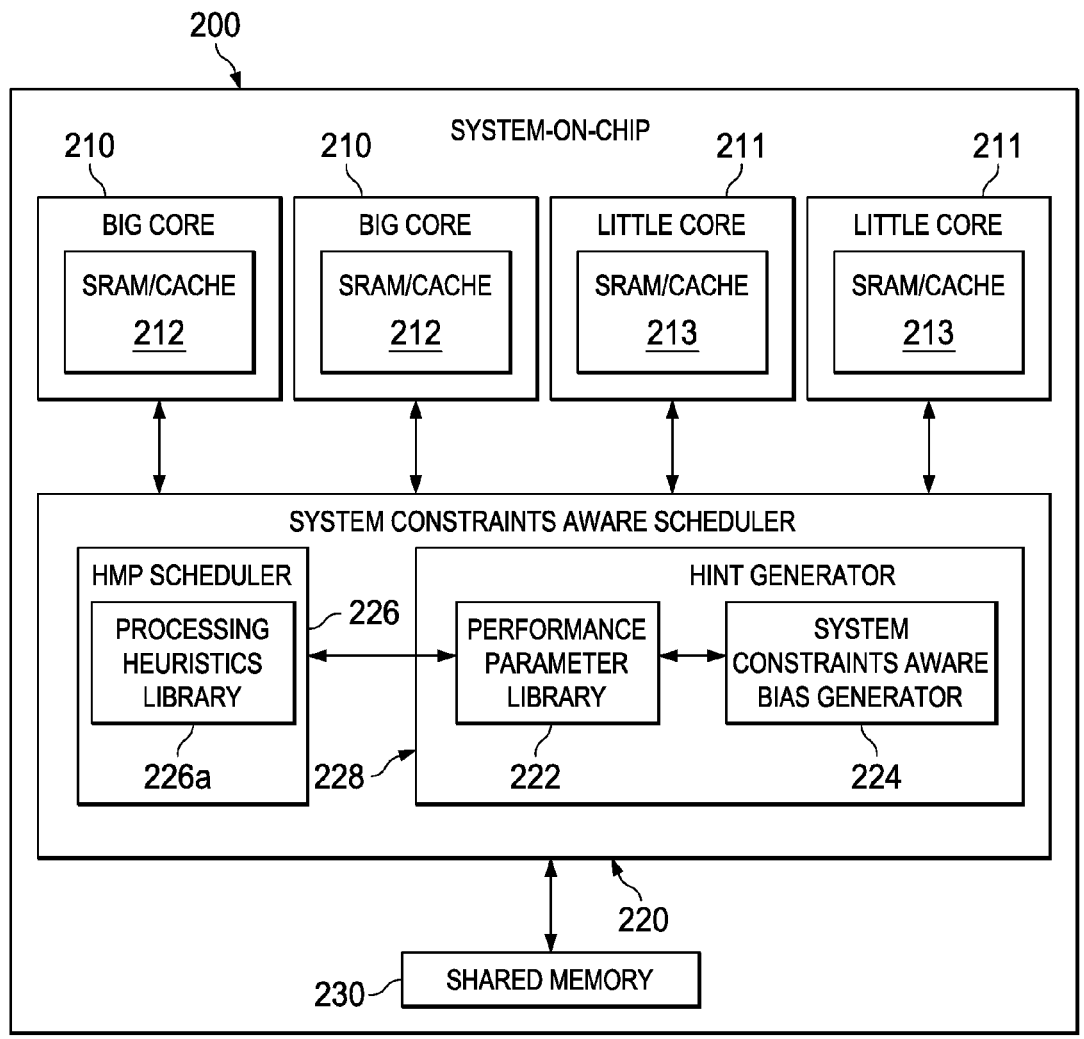
FIG. 2 is a block diagram illustrating a computing system including a heterogeneous multicore processor configuration in accordance with example embodiments of the disclosure.

FIG. 2 is a block diagram illustrating a computing system including a heterogeneous multicore processor configuration in accordance with example embodiments of the disclosure. A computing device is illustrated as a SOC 200 that includes multiple cores of different types, for example two "big" cores 210 and two "little" cores 211. A shared memory 230 communicates with big cores 210 and little cores 211 via a system constraints-aware scheduler 220. Although the illustrated elements of the computing system 200 are formed using a common substrate, the elements can also be implemented in separate circuit boards and packages (including the shared memory 230). Further, the illustrated elements can be implemented using various combinations of hardware and software and thus the illustrated elements are not necessarily mutually functionally and/or structurally separate.

Each of the processor cores 210 and 211 typically includes an instruction queue that is arranged to receive instructions for executing a task selected by the system constraints-aware scheduler 220. For example, the instructions can be stored in a level-1 instruction cache such as SRAM/Cache 212 for respective big cores 210 and SRAM/Cache 213 for respective little cores 211. The instructions can be accessed from the shared memory 230 that is arranged to store program and data information that can be accessed by (at least) each of cores 210 and 211.

The system constraints-aware scheduler 220 is arranged to select specific processing tasks to be executed on specific processor cores (e.g., including selecting the operating voltages and clock frequencies used by the specific processor cores). The specific processing tasks to be executed on specific processor cores are selected based, for example, on specified (e.g., predetermined or calculated during runtime) system constraints and the monitoring of changes in performance constraint parameters.

The system constraints-aware scheduler 220 includes a HMP scheduler 226 and a hint generator 228. The HMP scheduler 226 is arranged to access the processing heuristics library 226a to schedule processing tasks (such as application or operating system tasks) for execution upon processing cores of varying sizes and processing capabilities. Hint generator 228 includes a performance parameter library 222 and a system constraints-aware bias generator 224 that is arranged to bias (e.g., supplies at least hints to) HMP scheduler 226. The biasing is arranged to influence the scheduling of tasks in response to one or more of the system constraints. More particularly, hint generator 228 can bias HMP scheduler 226 to allocate processing tasks to specific cores so that performance of the cores is optimized in view of changing system constraints. The optimized scheduling, for example, results in a substantial difference in performance of the processor cores that can be manifest as generally cooler operating temperatures, longer operating times, faster response to user input, and the like.

Generally, the HMP scheduler 226 is arranged to schedule task assignments amongst multiple cores, for example by using a load balancing mechanism. The load balancing mechanism distributes the processing tasks over the multiple cores depending on predetermined hardware and/or software limitations. Conventional systems typically have static configurations, where, for example, only a limited number "k" of cores can run at maximal frequency out of "N" available cores (where k<N). As used in conventional systems, HMP schedulers use a heuristic function to assign the processing tasks in asymmetric heterogeneous architectures for determining optimal allocation of processing tasks to cores without taking into account system constraints. As a result, parts of conventional systems that are limited by the constraints are typically shut down or limited in frequency (which leads to degradation in performance in timeliness and/or quality) as the values for the constraints (such as thermal or power related constraints) are approached.

When using SOCs based on a heterogeneous MPU architecture in different types of computing devices, the overall performance of the device is affected by different system constraints. The system constraints-aware scheduler disclosed herein is arranged to maximize system performance of a device by dynamically adjusting scheduler heuristics in response to changing system conditions in accordance with system constraints. As used herein, system constraints refer to limits (e.g., "thermal envelope") of performance constraint parameters inside which the MPU (and the substituent processing cores) are to operate.

For example, performance constraint parameters are used to specify ranges for the system constraints in which the system is designed to operate. The ranges of the performance constraint parameters can be used describe a multi-dimensional operating envelope that encompasses changes in thermal constraints (such as changes in case and/or junction temperatures), changes in the battery level of the device, a change in a selected user mode of the device, and the like. Various selected performance constraint parameters can be independently monitored by measuring (and/or calculating) the performance constraint parameters at various points in time during operation of the scheduler and/or in response to system, user-caused, and/or external events. A substantial "change" in performance constraint parameters allows detection of changes of the performance constraint parameters that occur, for example, when a (e.g., calculated or measured) value of the performance constraint parameters approaches or exceeds a valid range of at least one of the system constraints settings.

Thermal constraints are an example of a "hard" (e.g., physical) constraint that can hamper the performance of an electronic device. The thermal performance of the device can be optimized, for example, by adjusting the scheduling of processing tasks by the HMP scheduler as a function of the junction and case temperatures of the computing device to maintain operation of the device within a given thermal envelope. More particularly, system performance can be optimized for different types of products, e.g., netbooks, set-top boxes, car infotainment products, and the like (which allow higher case temperatures and thus have lower thermal constraints) and smart phone-types of products (which restrict case temperatures to below 48° Celsius and thus have relatively high thermal constraints) by tuning performance constraints on a device-by-device basis.

One example of the dynamic system constraints in the thermal framework is the junction temperature of the integrated circuit (such as measured by a heat-sensitive junction from which the local temperature can be determined). In case of increasing junction temperatures in a core during operation, the heuristics as well as the load balancing mechanism of the HMP scheduler are responsively biased towards increasingly scheduling more tasks on cores that currently have lower junction temperatures (such as a relatively "little" cores, which are more power efficient but typically slower than "big" cores with respect to the task being assigned). Thus, in the given example, thresholds for heuristics determining big core speedups are increased, which biases the HMP scheduling such that tasks are increasingly assigned to the little cores, such that relatively very few performance-critical tasks are assigned to the big cores.

Thermal policies can be enforced using "hard" limitations, such as limiting the operating frequency or number of available cores. "Soft" limitations can include other system constraints such as user defined modes (e.g. "low power", "normal", "high performance") and battery level of the device. Thus the "hard" and "soft" limitations are system constraints that can include predetermined settings of a particular parameter, or they can include adjustable parameter settings that can be changed by tuning the performance constraint parameters (discussed below with respect to FIG. 3) of the device (including variances caused by product aging, such as the decrease in battery storage that occurs over the lifetime of the device and/or battery itself).

Figure 3:
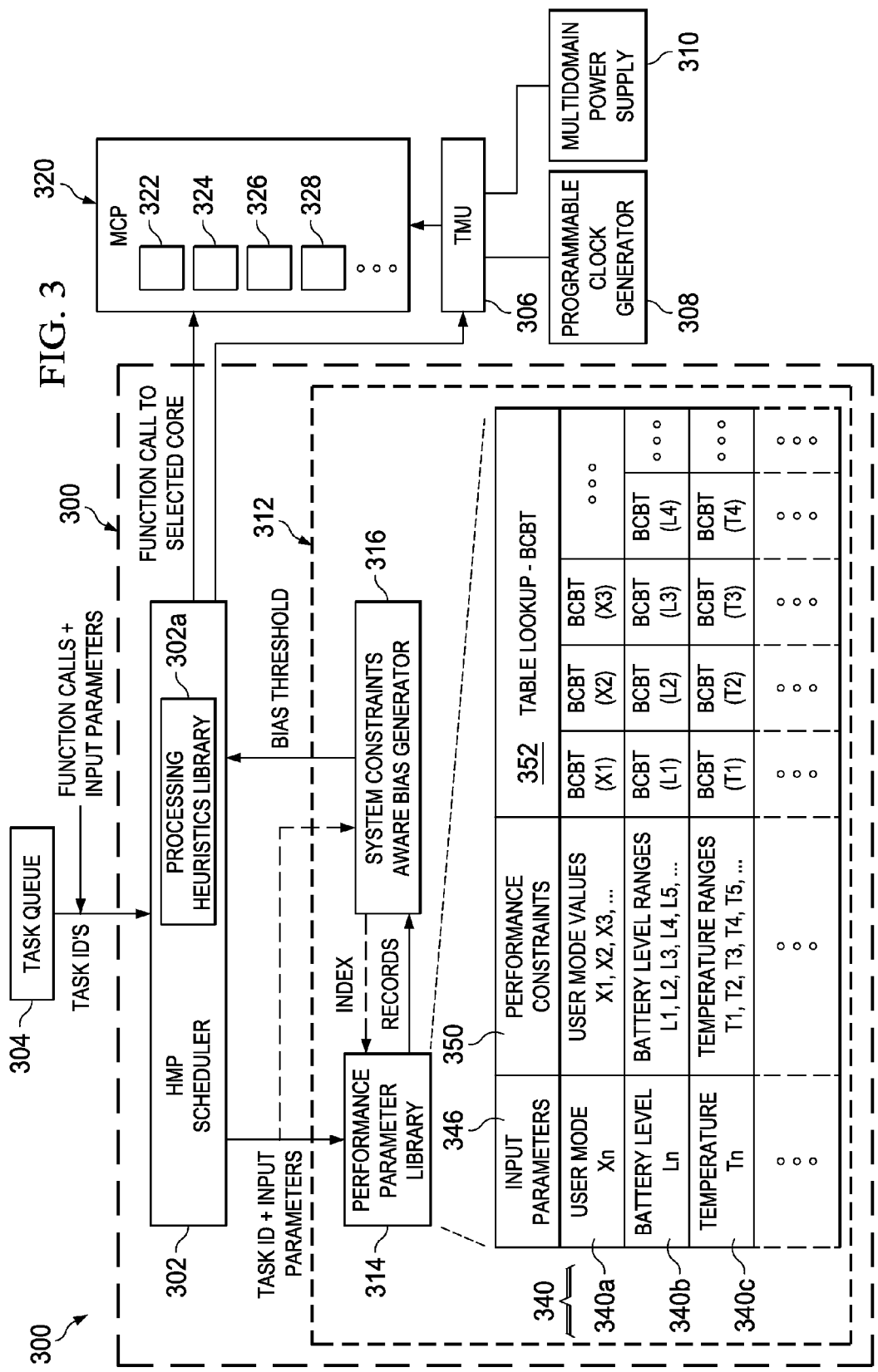
FIG. 3 is a block diagram illustrating a system constraints-aware HMP scheduling system 300 in accordance with embodiments of the present disclosure.

FIG. 3 is a block diagram illustrating a system constraints-aware HMP scheduling system 300 in accordance with embodiments of the present disclosure. HMP scheduling system 300 includes an HMP scheduler 302 that is communicatively coupled between task queue 304 and MCP (multiple core processor) 320. In various example embodiments, the MCP 320 is an asymmetric heterogeneous architecture may be composed of big and little cores, such as a combination of any number of RISC or CISC cores, wherein heuristics are used by HMP scheduler 302 to determine a task "bias" towards a certain core type (e.g., "big" or "little").

Task queue 304 is arranged to provide to the HMP scheduler 302 task identifiers that are used in determining upon which of the heterogeneous cores 322, 324 326, 328 of MPU 320 the identified tasks should run. The heterogeneous cores typically have at least one core that has differing performance capabilities and characteristics from at least one other core (thus the number and types of cores can vary from the illustrated example).

In operation, the task queue 304 may use a FIFO allocation order to issue processing task requests to the HMP scheduler 302. For example, each task includes a task identifier of a processing task to be performed by a core and each successive processing task is issued using an order that is indicated by a FIFO counter. The task requests can also include indications (e.g., that include pointers) of function calls and input parameters that are used during execution of the identified task.

The HMP scheduler 302 forwards information from the task requests to the hint generator 312, which is arranged to supply biased task information in response to the received task request information. The supplied biased task information is used by the HMP scheduler 302 to allocate processing tasks so that the HMP scheduler assigns tasks in accordance with dynamic changes of the performance constraint parameters in view of (e.g., static or dynamic) system constraints. Hint generator 312 includes a performance parameter library 314 and a system constraints-aware bias generator 316.

The performance parameter library 314 includes a plurality of entries 340 (e.g., that are illustrated as rows) that are used in generating a hint that is used to identify a specific (e.g., type of) core towards which the redirection of the identified task should be biased. Each entry includes input parameters 346, performance constraints 350, and BCBT (big core bias threshold) values stored in table lookup 352. The input parameters 346 can include information for prioritizing biasing in accordance with different priorities in various scenarios involving differing types soft system constraints. For example, the input parameters 346 include a variable Xn used to indicate a user mode 340a, a variable Ln used to indicate a battery level 340b, and a variable Tn used to indicate a temperature 340c. The performance constraints 350 can include one or more threshold values X1, X2, X3, and so on for user mode values, one or more threshold values L1, L2, L3, L4, L5, and so on for battery level ranges, and or more threshold values T1, T2, T3, T4, T5, and so on for temperature ranges.

In various embodiments, the system constraints-aware bias generator 316 is arranged to receive the task identifiers from the HMP scheduler 302 and performance constraint parameters. The system constraints-aware bias generator 316 uses the received task identifiers to make record requests of the heuristics library to determine the parameter constraints and core ID (and other such indexed information) associated with each received task identifiers. The system constraints-aware bias generator 316 uses information from the received records to generate a hint (e.g., a BCBT) that, for example, suggests which core should be targeted for performing the associated task ID.

In an example, the HMP scheduler 302 interfaces with the hint generator 312 (which includes the performance parameter library 314 and the system constraints-aware bias generator introduced above). The system constraint bias generator 316 is arranged to monitor the system constraints (user mode, battery level, temperatures) and to determine a bias threshold in response. For example, the bias threshold is typically computed in accordance with the formula: Bias Threshold=w1*BCBT(Xn)+w2*BCBT(Ln)+w3*BCBT(Tn), where "w" is a weighting factor where w1+w2+w3=1.

The weighting factor allows heavier or lesser importance to be assigned to each performance constraint parameter type: for example, a user mode type can be assigned an importance of 15 percent, a battery level type can be assigned an importance of 35 percent, and a temperature type can be assigned an importance of 50 percent by adjusting the weighting factors.

The weighting factors can be adjusted dynamically in response to performance constraint parameter values. For example, as a performance constraint parameter of any type (such as battery level) approaches a threshold (such as 10 percent charge remaining or a temperature of 48° Celsius of 65), the associated weighting factor can be dynamically increased such that additional biasing is applied in accordance with the performance constraint parameter value approaching (or surpassing) a critical level.

In operation, the bias threshold is used by the HMP scheduler to determine which tasks are to be mapped on big as compared to small cores. For example, the performance constraint parameters (e.g. user mode, battery level, temperature) are monitored and a BCBT (Big Core Bias Threshold) is determined in response to the input performance constraint parameters. The BCBT is output and used by the HMP scheduler 302 to map a given task to a specific core type.

Thus, in a first operational situation where the device is in a low power mode, with a low (e.g., nearly discharged) battery, and having a high operating temperature, the HMP task mapping threshold value is changed to a "low" threshold value (e.g., a minimum BCBT value). The low threshold BCBT value results in biasing only the very performance intensive tasks to be executed on big cores and increasing the number of tasks are executed on small cores (thus, e.g., reducing power consumption and dissipation).

In a second operational situation where the device is in a normal power mode, with a normally charged battery, and having a normal operating temperature, the HMP task mapping threshold value is changed to a "normal" threshold value (e.g., a minimum BCBT value). The normal threshold BCBT value results in normal operation of the HMP scheduler based on tasks heuristics is not changed.

In a third operational situation where the device is in a high performance mode, high (e.g., fully charged) battery, and having a low temperature, the HMP task mapping threshold is changed to a "high" threshold value. The high threshold value results in an increased number of tasks that are scheduled on the big core processors.

Accordingly, the hint generator 312 (which includes the performance parameter library 314 and the system constraints-aware bias generator 316) is arranged to monitor one or more predetermined performance constraint parameters of the processor at any given point in time and to compare the performance constraint parameters with related system constraint settings (such as comparing temperature constraints with temperature performance constraint parameters, comparing power constraints with power performance constraint parameters, and the like). The hint generator biases the HMP scheduler 302 to select a targeted processor cores depending on the change in the one or more performance constraint parameters. The biasing of the cores results in optimizing the system performance at any point in time to operate within the performance constraints. This in turn results in a substantial difference in performance of the system (e.g., as compared with conventional HMP schedulers).

In some example embodiments, the system constraints-aware bias generator 316 is arranged to bias a heterogeneous multicore processor scheduler. Dynamically biasing the HMP heuristics eases design considerations by reusing portions of existing HMP schedulers and system constraints-related functions for a large variety of products having different constraints, such as temperature, power (e.g., including battery charge capacity), speed, and the like.

The HMP scheduler 302 communicates with heterogeneous multiprocessor cores 320 and a thermal management unit (TMU) 306. Thermal management unit 306 manages system temperatures by determining the temperatures of each core and/or packaging (e.g., by measuring the temperature at semiconductor junctions throughout the substrate). The measured temperatures can be supplied to the hint generator 312 for purpose of biasing the selection of tasks from the task queue 320. Biasing the selection of tasks allows the MCP 300 to not exceed performance constraints, which minimizes the amount of intervention by the TMU to control system temperatures that would otherwise be required. For example, less commands are required to slow (or gate) clocks generated by programmable clock generator 308 and/or reduce power consumption produced from multi-domain power supply 310.

A dynamic approach to HMP scheduling allows running performance optimized HMP scheduling functions with minimal boot time or with minimal production time tuning. Tuning of the processor is the determination of how execution of each of a group of selected processing tasks affects one or more performance constraint parameters. Production time tuning can be used determine the magnitude of the bias towards "little" cores depending on the temperature gradient (for example, between the case temperature and, junction temperature, etc.). The tuning of the processor also takes into account states of the processor cores so that the tuning process can monitor how changes to the performance constraint parameters affect the performance of the processor and can respond to these when changing the parameters to improve performance. Hence, in some embodiments, system constraints may include variable settings (such as settings stored in input parameters 346).

Dynamically adjusting the MPU scheduling bias (e.g., in accordance with the performance constraints 350 determined during the tuning process) yields at maximum performance efficiency at any point in time and under given system constraints because performance efficiency is based on actual use (e.g., in a particular device) instead of predicted use of the cores and the device. The system constraints-aware HMP scheduler can also result in a competitive performance advantage over equivalent architectures as it optimizes performance under given operating conditions at any point in time during use.

As discussed above, the BCBT (big core bias threshold) method used by the performance parameter is an example embodiment of a constraint-aware HMP scheduler (e.g., which uses system constraints to change the BCBTs, which in turn modifies task mapping). More generally, the HMP scheduler 302 is arranged to use various system constraints to modify the task mapping on the MCP 320, which includes heterogeneous CPU cores. Under favorable conditions (e.g., high battery level, low temperature, and the like) more tasks can be mapped to higher performing cores whereas under less favorable, more constrained, conditions (e.g., low battery level, high temperature, etc.) less tasks are scheduled to be performed on higher performing cores. Thus, the HMP scheduling method can include other methods besides the use of BCBT-based biasing heuristics as a HMP scheduling technique.

Figure 4:
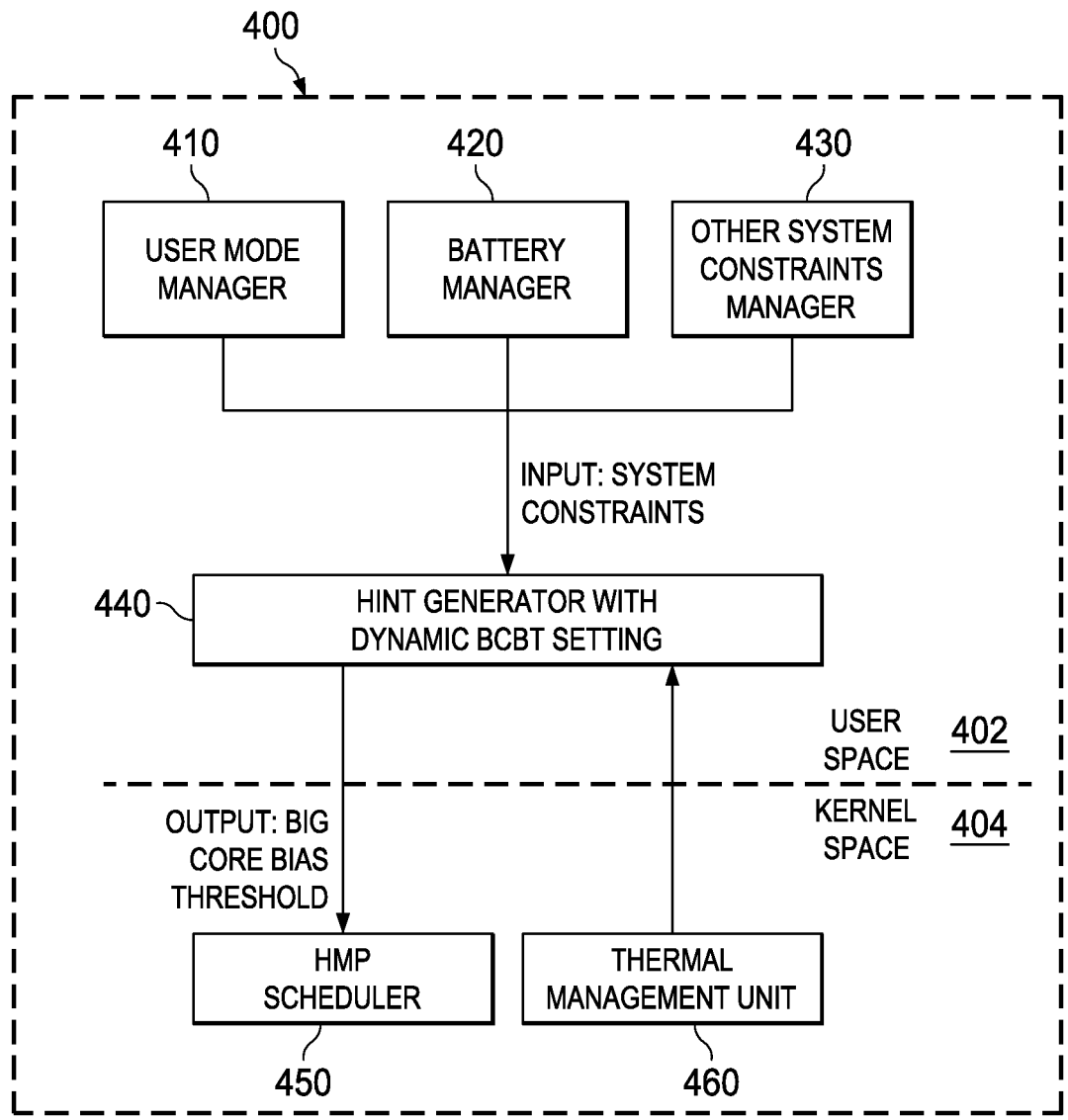
FIG. 4 is a block diagram that illustrates a high-level software architecture view of a constraints-aware scheduling system in accordance with example embodiments of the disclosure.

FIG. 4 is a block diagram that illustrates a high-level software architecture view of a constraints-aware scheduling system in accordance with example embodiments of the disclosure. View 400 includes a user space 402 and a kernel space 404.

The user space 402 includes process interfaces (e.g., user mode manager 410, battery manager 420, and other system constraints manager 430) that affect the input constraints that are used by (for example) the hint generator 312 to provide a value that is used to bias the selection of a core. The kernel space 404 includes the HMP scheduler 450 and the thermal management unit (TMU) 460.

The user mode manager 410 is arranged to manage a user mode (e.g., low power, normal, high performance, and the like), and provide an interface where a user may select the user mode.

The battery manager 420 is arranged to select a power mode (e.g., powered, battery, low battery, shut-down, and the like) in response to user and/or system input. For example a user can select various profiles that set constraints as to what events (such as warnings, changes in user mode, and the like) are initiated in response to different performance constraint parameters (e.g., battery level).

The other system constraints manager 430 includes other interfaces that affect various performance constraints, such as the BIOS (basic input/output services), processor and bus clock speeds, peripheral device selection, the TMU and the like. Various settings in the other system constraints manager 430 that may be set by a user and/or that include system based constraints specified by other managers. The TMU provides input to the system on thermal constraints θ(T), for example weighted running average temperature, being a function of actual measured temperatures of the device The input constraints are used as input settings for executing (e.g., by the system constraints-aware bias generator 316) a big core bias threshold function (BCBT). The constraints-aware scheduling system uses the input settings to dynamically determine a big core bias threshold (BCBT) value.

A BCBT value can be calculated in response to each constraint. For example a BCBT θ(T)) value is calculated during system operation in response to a temperature function, a BCBT (battery level) value is calculated during system operation in response to a battery level, and a BCBT (user mode) value is calculated during system operation in response to a selected user mode. The temperature function can be derived from measuring temperatures at various locations (as described above) over various time intervals (e.g., to determine whether the device or a particular core is heating up, remaining substantially at the same temperature, or cooling down with respect to a temperature target.

In various example embodiments, a combined BCBT value can be calculated in response to constraints of differing categories (e.g., mode, temperature, and the like). The combined BCBT value can be calculated from the BCBT values for each category (e.g., such as temperature, user mode, battery level, and the like.) Thus, a single BCBT value can be used that reflects a degree of bias that is used by the HMP scheduler 450 to select the type of core upon which the received tasks should be executed.

Figure 5:
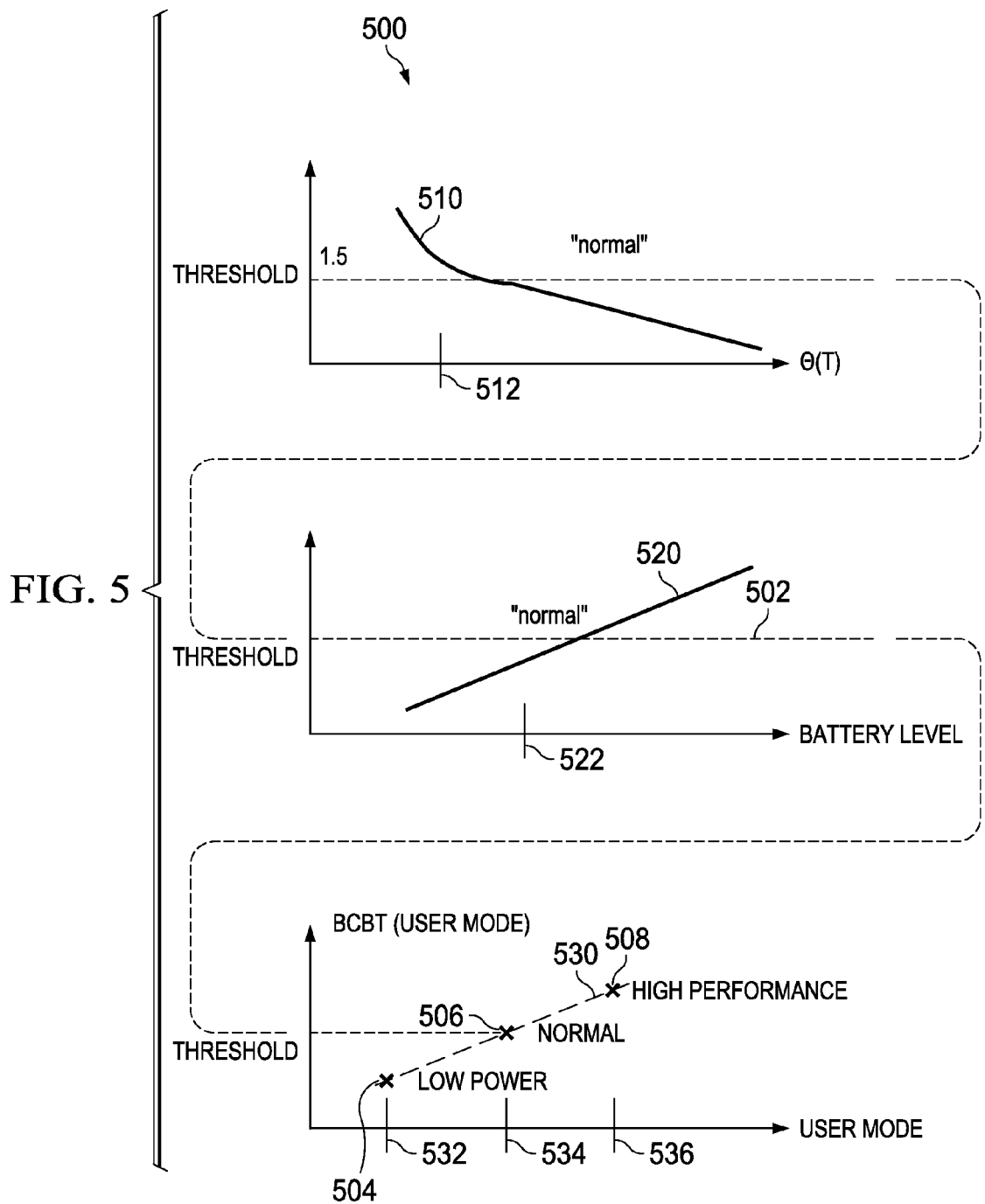
FIG. 5 is a graph diagram that illustrates bias threshold functions over system constraints in accordance with example embodiments of the disclosure.

FIG. 5 is a graph diagram that illustrates bias threshold functions over system constraints in accordance with example embodiments of the disclosure. The bias threshold function can be, for example, linear, exponential, or any function suitable for defining a bias threshold over a range of given system constraint levels. The bias threshold functions can be determined during characterization and test of a device before deployment and/or or updated at a subsequent time (e.g., to compensate for changes results from device and/or battery aging).

Curve 510 is a bias threshold (temperature) curve that is plotted over a horizontal axis that represents increasing temperatures and a vertical axis that represents a bias value. The temperature value can be the result θ(T) of a weighted running average temperature. For example, bias values are high when temperatures are low, which biases the scheduler in favor of using big cores to execute tasks. When temperatures are high, bias values are low, which biases the scheduler in favor of using small cores to execute tasks.

Curve 520 is a bias threshold (battery level) curve that is plotted over a horizontal axis that represents increasing battery charge and a vertical axis that represents a bias value. For example, bias values are high when battery charge is high, which biases the scheduler in favor of using big cores to execute tasks. When battery charge is low, bias values are low, which biases the scheduler in favor of using small cores to execute tasks.

Curve 530 is a bias threshold (user mode) curve that is plotted over a horizontal axis that represents increasing performance settings and a vertical axis that represents a bias value. For example, bias values are high when performance settings are high, which biases the scheduler in favor of using big cores to execute tasks. When performance settings are low (e.g., when a lower power mode is enabled by the user), bias values are low, which biases the scheduler in favor of using small cores to execute tasks.

For example, a user selects "normal" user mode (illustrated at point 534 on the x-axis), which is illustrated as threshold level 502. Threshold level 502 is assigned a bias value by the y-value (e.g., 1.5) that corresponds to the y-value of point 506. As illustrated, a high performance setting 536 (corresponding to point 508 on the curve 530) corresponds to a bias value that is greater than the threshold value defined by threshold level 502. Likewise, a low performance setting 532 (corresponding to point 504 on the curve 530) corresponds to a bias value that is less than the threshold value defined by threshold level 502.

A big core bias threshold can be determined as a combined function of the system constraints, e.g. using a weighted sum of BCTB(θ), BCBT(battery level), and BCTB (user mode), where θ (theta) is a measured operating temperature (for example). The computed big core bias threshold value biases the scheduler to optimized performance of the system. For example, the system constraints tend to cause the HMP scheduler to only schedule tasks above the big core bias threshold on big cores and maintain load balancing only across little cores. (In other example embodiments, the big core bias threshold can be implemented as a "minimum" function that chooses the value of the smallest system constraint value.)

For example, as shown in FIG. 5, a threshold value of 1.5 implies a standard HMP scheduling mechanism wherein tasks are mapped on specific cores based only on the HMP processing heuristics library. A threshold value above 1.5 implies biasing more tasks towards big cores, whereas a threshold value below 1.5 implies biasing more tasks towards the little cores. Under normal conditions, the HMP scheduler 302 uses the standard processing heuristics library 302a for mapping tasks to big and little cores and assigns or migrates tasks to big cores when the big core bias is above a predefined threshold value of the BCBT (e.g. 1.5). Accordingly, the bias threshold can be adjusted in response to performance constraint parameters that change during (e.g., normal) operation.

When system constraints other than "normal" are set, the big core bias threshold is computed as maximum weighted sum of the individual bias thresholds, an individual bias threshold being a function of a given system constraint. A decreasing big core bias threshold thus results in a lesser number of tasks to be scheduled on the big core(s), which implicitly causes the load and required operating point capacity of the big core(s) to be reduced.

When, for example, thermal constraints increase, some operating system tasks that were previously scheduled on big core(s) are then scheduled on little core(s). Therefore the operating system task allocation on "big" versus "little" core(s) can significantly vary depending on the system constraints. Accordingly, OS task mapping for a given set of running applications on big" and little core types, respectively, will vary over time, depending on the system constraints.

Progressively adjusting scheduling heuristics from big towards little core bias under thermal, power management, or other system level constraints helps to delay or even avoid mandatory curtailments. Examples of mandatory curtailments include, for example, forcing system resources to shut down, limiting resources by reducing clock frequency and/or power, and the like. Avoiding the mandatory curtailments typically results in an overall performance gain by, for example, avowing the typically less efficient mandatory curtailments.

The disclosed subject matter further contemplates a method of arranging a scheduler to allocate one or more processing tasks to a plurality of heterogeneous processor cores, and arranging a hint generator to communicate with the scheduler. The hint generator may include a heuristics library receiving processing tasks from a task queue and receiving data of performance constraint parameters measured at any given point in time. The heuristics library performs a system constraints-aware function to arrange the processing tasks as a function of predetermined system constraints and the system constraints-aware function biases the scheduler to select a processor core to perform a processing task resulting in a substantial difference in performance of the processor. In some embodiments, computation of the system constraints-aware function is based on variables including a processing task identifier, a processor core identifier, and a change in the one or more performance constraint parameters. In further embodiments, the system constraints-aware function may be a big core bias function.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A processor comprising:
a plurality of processor cores, each of which is arranged to perform processing tasks, and wherein at least one of the processor cores is of a different architecture than the other core(s);
a scheduler that is arranged to receive task identifiers of respective processing tasks from a task queue and to allocate a selected core of the processor cores for each respective processing task received from the task queue; and
a hint generator that is arranged to monitor performance constraint parameters of the processor during operation of the processor and to generate a hint in response to the monitored performance parameters, wherein the scheduler is arranged to allocate the respective processing task from the task queue to the selected core in response to the generated hint, wherein the generated hint is generated in response to a bias threshold determined in response to a first comparison of a first monitored performance constraint parameter with a first system constraint setting and to a second comparison of a second monitored performance constraint parameter with a second system constraint setting, wherein the selected core is arranged to execute the respective processing task from the task queue, wherein the hint generator is arranged to store the first and the second system constraint settings, and wherein the bias threshold is determined using a weighting factor for each of the first and second system constraint settings.

2. The processor of claim 1, wherein at least one of the weighting factors is dynamically adjusted in response to a change in at least one of the monitored performance parameters.

3. The processor of claim 1, wherein the bias threshold is determined in response determining the greater of respective thresholds of the first and second system constraint settings.

4. The processor of claim 3, wherein the bias threshold reflects a bias towards a core type that is associated with the lesser of respective thresholds of the first and second system constraint settings.

5. The processor of claim 4, comprising a heterogeneous multicore scheduler that is arranged to receive the bias threshold and to allocate the selected core of the processor cores in accordance with the bias reflected towards the core type that is associated with the greater of respective thresholds of the first and second system constraint settings.

6. The processor of claim 1, wherein one of the performance constraint parameters includes a user defined mode, wherein each user mode is associated with a threshold value.

7. The processor of claim 1, wherein the first system constraint setting is a performance constraint parameter of a type that includes temperature constraints.

8. The processor of claim 7, wherein the second system constraint setting is a performance constraint parameter of a type that includes user mode constraints or power constraints.

9. The processor of claim 1, wherein the plurality of processor cores includes a first core type that consumes more power than a second core type.

10. A processor, comprising:
a plurality of processor cores, each of which is arranged to perform processing tasks, and wherein at least one of the processor cores is of a different architecture than the other core(s);
a scheduler that is arranged to receive task identifiers of respective processing tasks from a task queue and to allocate a selected core of the processor cores for each respective processing task received from the task queue; and
a hint generator that is arranged to monitor performance constraint parameters of the processor during operation of the processor and to generate a hint in response to the monitored performance parameters, wherein the scheduler is arranged to allocate the respective processing task from the task queue to the selected core in response to the generated hint, wherein the generated hint is generated in response to a bias threshold determined in response to a first comparison of a first monitored performance constraint parameter with a first system constraint setting and to a second comparison of a second monitored performance constraint parameter with a second system constraint setting, and wherein the first monitored performance constraint parameter is of a constraint type that is different from the constraint type of the second monitored performance constraint parameter, wherein one of the performance constraint parameters includes a user defined mode, wherein each user mode is associated with a threshold value, and wherein the bias threshold is determined using a weighting factor for each of the first and second system constraint settings.

11. The processor of claim 10, wherein the selected core is arranged to execute the respective processing task from the task queue.

12. The processor of claim 11, wherein the hint generator is arranged to select the first and the second system constraint settings in response to the respective task identifier.

13. The processor of claim 10, wherein the hint generator is arranged to store the first and the second system constraint settings.

14. A scheduling system, comprising:
a scheduler that is communicatively coupled with a plurality of heterogeneous processor cores and with a task queue including one or more processing tasks, and wherein the scheduler is arranged to allocate the processing task from the task queue to a selected processor core of the plurality of processor cores based on a heuristic function and a load balancing mechanism; and
a hint generator that is arranged to monitor predetermined performance constraint parameters of the processor during operation of the scheduler and to generate a hint for biasing a selection of a core type of the plurality of heterogeneous processor cores in response to the monitored performance parameters, wherein the generated hint is arranged to bias a selection of a core type of the plurality of heterogeneous processor cores, and wherein the scheduler is arranged to allocate the selected core of the processor cores in accordance with the generated hint, wherein the generated hint is generated in response to a bias threshold determined in response to a first comparison of a first monitored performance constraint parameter with a first system constraint setting and to a second comparison of a second monitored performance constraint parameter with a second system constraint setting, wherein the system constraints are limits of performance constraint parameters inside which the processor is to operate, and wherein the first monitored performance constraint parameter is of a constraint type that is different from the constraint type of the second monitored performance constraint parameter, and wherein the bias threshold is determined using a weighting factor for each of the first and second system constraint settings.

15. The system of claim 14, wherein the hint is a bias threshold generated in response to comparing each of the monitored performance constraint parameters with one or more related system constraints each of which is associated with a respective core type.

16. The system of claim 15, wherein the scheduler allocates processing tasks in accordance with the bias threshold when the bias threshold exceeds a predefined threshold value, and wherein each monitored performance constraint parameter includes at least two of a temperature, a user defined mode, and a battery level of a computing device.

17. A method, comprising:
receiving from a task queue a succession of processing tasks for execution upon a plurality of heterogeneous processor cores in a processor, each of which is arranged to perform the respective processing tasks, wherein at least one of the processor cores is heterogeneous with respect to the architecture of at least one other of the processor cores, and wherein each processing task is associated with a respective task identifier;
monitoring one or more performance constraint parameters of the processor during operation of the processor;
generating a hint in response to comparing a first monitored performance constraint parameter with a first related system constraint setting and in response to comparing a second monitored performance constraint parameter with a second related system constraint setting, wherein the generated hint is arranged to bias a selection of a core type of the plurality of heterogeneous processor cores, wherein the system constraints are limits of performance constraint parameters inside which the processor is to operate, and wherein the first monitored performance constraint parameter is of a constraint type that is different from the constraint type of the second monitored performance constraint parameter, wherein the generated hint is generated in response to a bias threshold that is determined using a weighting factor for each of the first and second system constraint settings; and allocating each of the respective processing tasks to a selected processing core that is selected in response to a core type.

18. The method of claim 17, further comprising selecting the first related system constraint setting in response to the respective task identifier.

19. The method of claim 18, further comprising selecting the second related system constraint setting in response to the respective task identifier.

20. The method of claim 17, wherein at least one of the weighting factors is dynamically adjusted in response to a change in at least one of the monitored performance constraint parameters.

* * * * *